ial No. 710,622

2,922,826
PROCESS FOR PREPARING CHLOROPRENE

Herbert L. Johnson and Archibald P. Stuart, Media, Pa., assignors to Sun Oil Company, Philadelphia, Pa., a corporation of New Jersey No Drawing. Application January 23, 1958
Serial No. 710,622

8 Claims. (Cl. 260—655)

This invention relates to a process for the preparation of chloroprene and more particularly relates to a process for the preparation of chloroprene substantially uncontaminated by the presence of other chlorohydrocarbons.

Chloroprene (2-chlorobutadiene-1,3) is a well known material valuable because it is easily polymerized, or copolymerized with other materials, to valuable, rubberlike materials by the use of polymerization catalysts or other polymerizing influence such as light or heat.

The preparation of chloroprene by various methods such as the addition of hydrogen chloride to vinyl acetylene in the presence of a catalyst, such as cuprous chloride and ammonia chloride, and by the dehydrochlorination of various polychlorobutenes has heretofore been described. Such methods, however, result in the formation of a mixture of compounds including, for example, 1-chlorobutadiene-1,3, in addition to the desired chloroprene from which the separation of chloroprene is difficult.

It has now been found that substantially pure chloroprene can be prepared by reacting butadiene-1,3 with sulfur dioxide to form crystalline butadiene sulfone, chlorinating the butadiene sulfone to form the dichloro derivative and treating such derivative to, in effect, split out $SO_2$ and HCl and produce chloroprene as the only chlorohydrocarbon reaction product. The reactions involved can be represented by the following steps, which are not intended to be a balanced equation:

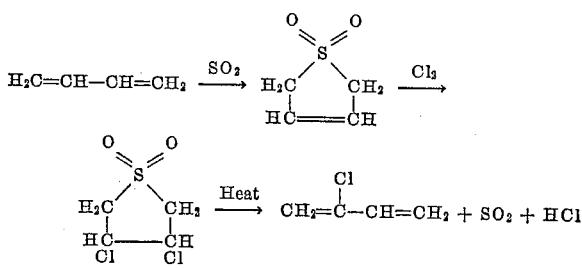

The preparation of butadiene sulfone by reacting butadiene with sulfur dioxide has heretofore been described, and known procedures for this step in the present process are suitable. The reaction of sulfur dioxide with butadiene-1,3 is practically quantitative, and an advantage of the process of the invention is that this portion of the process can be performed with butadiene contaminated with substantial quantities of other hydrocarbons, including other unsaturated hydrocarbons, which boil at about the same temperature as butadiene-1,3, since the butadiene-1,3 reacts to the substantial exclusion of such other materials present. In preparing butadiene sulfone, a temperature of from about 75° C. to 125° C. is preferred, it being only necessary that sulfur dioxide and butadiene be contacted within this temperature range. When the butadiene is admixed with other hydrocarbons, such other hydrocarbons are readily removed from the crystalline butadiene sulfone.

After preparing the butadiene sulfone, it is chlorinated to form the dichloro derivative. The chlorination is advantageously accomplished by contacting the sulfone dissolved in an inert solvent such as carbon tetrachloride or chloroform with chlorine at a temperature of from about 0° C. to 30° C. The conditions of chlorination are mild and substantially the only product obtained is 3,4-dichloride of butadiene sulfone.

The dichloro derivative is then treated to produce chloroprene. This treatment advantageously consists of heating the dichlorobutadiene sulfone to a temperature of about 450° C. to 650° C. in vapor phase, at which temperature $SO_2$ and HCl are split out and chloroprene is formed as substantially the only chlorohydrocarbon product of the reaction. If desired, a catalyst can be employed in this step, which permits the use of a somewhat lower temperature, say from about 150° C. to 450° C. For example, zinc chloride, cadmium chloride, alumina, and ferric chloride can be used with good results.

In a further embodiment of the invention, the 3,4-dichloride of butadiene sulfone is heated in an aqueous caustic solution or in an organic base such as an amine including, for example, triethanolamine and tripropanolamine at a temperature above the boiling point of chloroprene, i.e., above a temperature of about 60° C. Advantageously this step can be performed at about the boiling temperature of the aqueous caustic solution or the organic base. Chloroprene is evolved and is recoverable in substantially pure form. Aqueous solutions of sodium hydroxide and potassium hydroxide having from about 5% to 30% caustic illustrate preferred caustic solutions, and triethanol amine illustrates organic bases, which can be used in this embodiment.

In a further embodiment, the dichlorobutadiene sulfone is treated under relatively mild conditions to split out HCl, and $SO_2$ is thereafter split out and removed by heating to an elevated temperature as above described. This embodiment, however, is essentially a two-step process, and hence generally is not preferred.

The following examples illustrate the process of the invention in which "parts" refers to parts by weight:

Example 1

Butadiene sulfone was prepared by reacting sulfur dioxide with butadiene in about equal molar proportions at a temperature of about 100° C. 50 parts of the resulting butadiene sulfone were dissolved in about 190 parts of carbon tetrachloride and gaseous chlorine was bubbled through the solution until the theoretical amount of chlorine was introduced into the butadiene sulfone, the total time being about 2 hours. About 69 parts of solid 3,4-dichloride of butadiene sulfone were obtained, which were recrystallized from isopropyl alcohol. A portion of the solid product, 1 part, was admixed with 1 part of triethanolamine and the mixture was heated to a temperature of from 200° C. to 220° C. for 2 hours at a pressure of about 20 mm. of mercury. Evolved gaseous products were passed through a cold trap. Chloroprene was the only chlorohydrocarbon recovered, a yield of 18%, based on the 3,4-dichloride of butadiene sulfone, being obtained.

Example 2

The foregoing procedure was repeated except that the dichlorobutadiene sulfone was heated with about an equal part of ferric chloride. Again, chloroprene was recovered as the only chlorohydrocarbon product.

The invention claimed is:

1. Process for the preparation of chloroprene which comprises subjecting the 3,4-dichloride of butadiene sulfone in the absence of a chlorinating agent to a temperature in the range of 150–650° C. to split out sulfur dioxide and hydrogen chloride, thereby to produce chloroprene.

2. Process for the preparation of chloroprene which comprises heating the 3,4-dichloride of butadiene sulfone in the absence of a chlorinating agent to an elevated temperature whereby sulfur dioxide and hydrogen chloride are split out, and recovering chloroprene from the reaction mixture.

3. Process according to claim 2 wherein the said dichloride is heated to a temperature of from 450° C. to 650° C.

4. Process according to claim 2 wherein the said dichloride is heated to a temperature of from 150° C. to 450° C. in the presence of a catalyst.

5. Process according to claim 2 wherein the said dichloride is heated to an elevated temperature in contact with an aqueous caustic solution.

6. Process according to claim 2 wherein the said dichloride is heated to an elevated temperature in contact with an organic base.

7. Process according to claim 2 wherein the said dichloride is heated to an elevated temperature in contact with an amine.

8. Process according to claim 2 wherein the said dichloride is heated to an elevated temperature in contact with triethanolamine.

References Cited in the file of this patent

UNITED STATES PATENTS

| | | |
|---|---|---|
| 2,180,115 | Lange et al. | Nov. 14, 1939 |
| 2,373,563 | Hooker et al. | Apr. 10, 1945 |
| 2,391,827 | Hearne et al. | Dec. 25, 1945 |
| 2,402,891 | Hooker et al. | June 25, 1946 |
| 2,430,016 | Hearne et al. | Nov. 4, 1947 |

OTHER REFERENCES

Jordan et al.: Jour. Am. Chem. Soc., vol. 71, pages 1875 and 1876, May 1949.